Jan. 2, 1951  M. BARNETT  2,536,867
MACHINE FOR COLLAPSING TUBES
Filed April 1, 1946
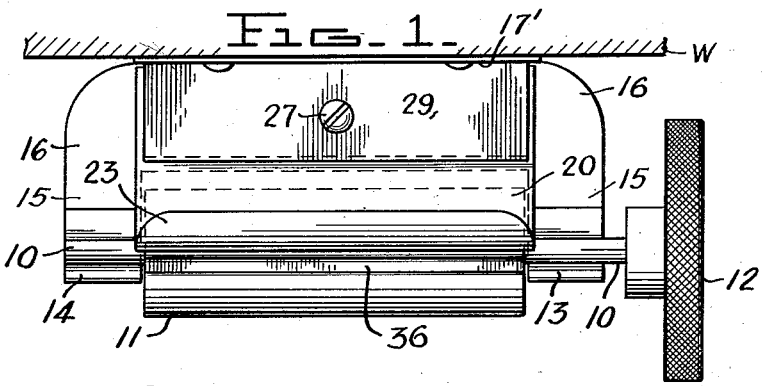
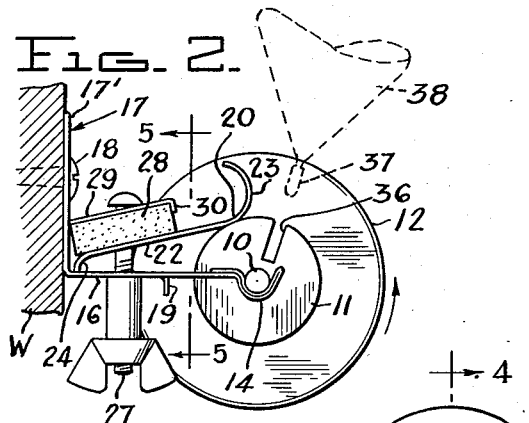
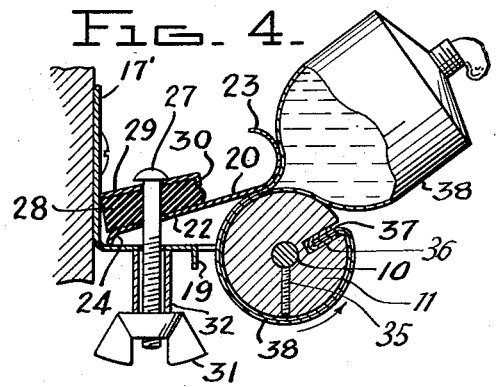
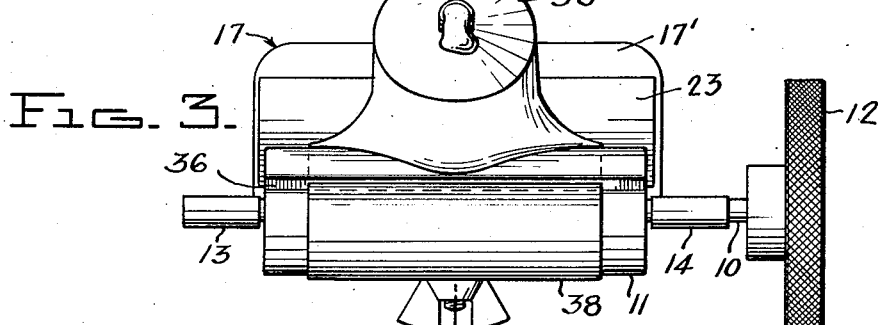
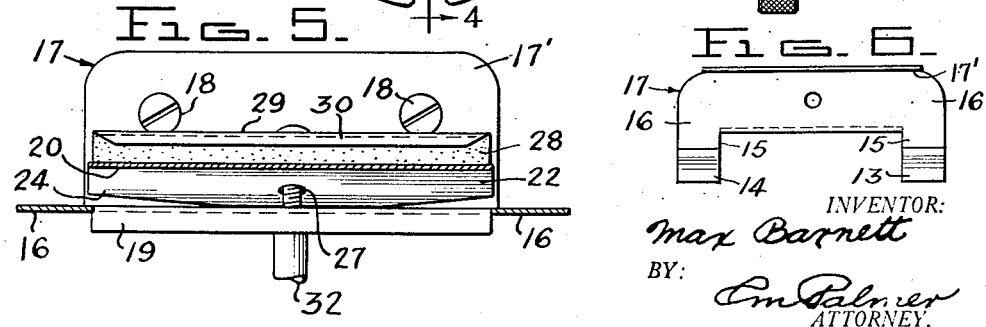
INVENTOR:
Max Barnett
BY:
Cm Palmer
ATTORNEY.

Patented Jan. 2, 1951

2,536,867

UNITED STATES PATENT OFFICE 2,536,867

MACHINE FOR COLLAPSING TUBES

Max Barnett, Brooklyn, N. Y.

Application April 1, 1946, Serial No. 658,639

3 Claims. (Cl. 222—97)

This invention relates to a device for dispensing the contents of collapsible tubes. Collapsible tubes are widely used for holding pastes, cements, inks and other semi-fluid substances. Often these tubes are quite large, and before their contents are exhausted, the outside of the tube becomes more or less coated with some of the contents making the tubes disagreeable to handle. Furthermore, the contents are generally expelled unevenly, and where the contents contain a volatile substance, they often dry up, before being completely used due to their being spread out too thinly along the length of a partly collapsed tube. The present invention seeks to overcome these disadvantages by providing a support for the tube, and an arrangement controlled by one hand of the operator for collapsing the tube uniformly as the contents is used and for expelling the entire contents therefrom. A feature of the invention is the provision of a simple and inexpensive support for a collapsible tube including a manually operated device effective at will to progressively force the contents thereof from the closed end of the tube toward the opening or nozzle of the tube. Another feature of the invention is the provision of a tube collapsing device of novel construction which can be assembled without tools from simple inexpensive parts, most of which are adapted to be stamped out of sheet metal. Other features will be found in the following description given with the aid of the accompanying drawings, wherein:

Fig. 1 is a plan view of a preferred form of the invention.

Fig. 2 is a side view.

Fig. 3 shows the invention in elevation.

Fig. 4 is a sectional view, the section being taken through 4—4 of Fig. 3.

Fig. 5 is a sectional view on the line 5—5 of Fig. 2, and

Fig. 6 is a plan view of the bracket.

The shaft 10 fixedly carries a roller 11 actuated by a wheel or knob 12 fixedly attached to one end of the shaft which is journalled in the arcuate and spaced bearings 13 and 14 projecting from the arms 15 of the horizontal support or shelf 16 integral with a vertical leg 17' adapted to be removably attached to the wall W by the screws 18.

The bracket defined by the leg or shelf 16 and leg 17' is designed to be formed from a single piece of metal which is self reinforced where required, to permit the use of quite thin stock. Depending from shelf 16 and interposed between arms 15 thereof is the strengthening flange 19.

Shaft 10 is removably retained in the arcuate bearings 13 and 14 by a pressure applying device which includes a pressure plate or brake 20 of the same general length as roller 11 having a generally flat wall 22, Fig. 2, disposed in a slanting or biased position relative to shelf 16 and having an upper and forward part adapted to be seated on the roller when empty or on the wound tube to apply the desired flattening pressure on the latter. This forward part embodies the arcuate lip 23 which in cooperation with the roller coacts to flatten the tube retained by the roller. The pressure plate or brake 20 also embodies at the lower and rear end thereof the slightly curved and depending flange or lip 24 tiltably resting on the shelf 16.

A pad 28 of rubber or other yielding material is mounted on the pressure plate 20. Superimposed on the pressure plate is a retaining or compressor plate 29 formed with a depending flange 30 near one edge which engages one face of the resilient pad 28, thus holding the pad in position. Retaining plate 29, pad 28, plate 20 and the horizontal leg 16 of the bracket are each formed with a centrally disposed opening, which openings are in alinement for the purpose of receiving a screw 27 which extends through the parts just mentioned. A wing nut 31 is threaded on the lower end of the screw, and between the wing nut and the bracket, a sleeve 32 is disposed on the screw for the purpose of spacing the nut from the bracket to make the nut more accessible.

Roller 11 is secured to shaft 10 by a headless screw 35 (Fig. 4) which is locked in position slightly below the surface of the roller. A longitudinal slot 36 adapted to receive the sealed end 37 of a collapsible tube 38 is formed in roller 11.

In operation, the sealed end 37 of a collapsible tube 38 is inserted into slot 36 and the knob 12 is actuated to turn roller 11 in a counter-clockwise direction as indicated by the arrows in Figs. 2 and 4. One end of the collapsible tube is slightly enlarged, and as the slot and the overlying portion of the tube are about to be drawn under the curved part or lip 23 of the pressure plate 20, wing-nut 31 is adjusted to regulate the pressure exerted on the tube by pressure plate 20. In the case of a full tube, a short portion may be initially drawn between the roller and pressure plate which is sufficient to hold the tube in place without exerting too great an initial pressure on the contents. Then when some of the contents are used, further adjustment may be made of the wing-nut to insure that the tube is being pressed perfectly flat to prevent any of the contents from being wasted. Since the lip 24 of the pressure plate 20 is slightly curved where it rests on the horizontal leg or fulcrum means 16 of the bracket 17 and since screw 27 is somewhat smaller than the holes in the parts through which it extends, the pressure plate may rock or tilt slightly, one way or another to adjust itself uniformly with respect to roller 11 whereby the tube is evenly flattened on the roller. This arrangement is particularly useful where the device is used in connection with tubes of different diameters. When a tube of small diameter is inserted, it is not necessary to insert it exactly at the middle of the roller. If a small tube is inserted into the roller but offset from the midpoint thereof, the plate 20 will still pivotally adjust itself to flatten the tube uniformly upon the roller 11. This adjustment is aided by the coaction of the curved lip 24 rocking or tilting on the rectilinear fulcrum means 16. The pressure plate 20 may be said to be pivoted relative to the bracket in that the latter as previously stated serves as fulcrum means.

Various changes may be made in details of construction and arrangement of parts without departing from the spirit of the invention or sacrificing any of the advantages thereof inherent therein.

I claim:

1. In a machine for expelling the contents of a deformable and collapsible tube, a bracket comprising a horizontally disposed shelf including spaced arms having bearing means, a shaft rotatably and removably sustained by said bearing means, a roller secured to said shaft and interposed between said arms and including means for retaining the sealed end of said tube for winding the latter about said roller on rotation of said shaft, a pressure plate biased relative to said arms and including a forwardly arranged upper part adapted to be seated on said roller or tube and embodying a rearwardly disposed lower part having a lip tiltably resting on said shelf, a pad mounted on said biased pressure plate, bolt means extending through said pad, pressure plate and shelf, adjustable means mounted on said bolt means for yieldably clamping said pad against said pressure plate, an arcuate lip extending from said upper part and cooperating with said roller to flatten said tube on rotation of said shaft, and a manipulator carried by said shaft.

2. In a machine for expelling the contents of a deformable and collapsible tube, a bracket comprising a horizontally disposed shelf including spaced arms having spaced bearing means, a shaft rotatably and removably sustained by said bearing means, a roller secured to said shaft and interposed between said arms and including means for removably retaining the sealed end of said tube for winding the latter about said roller on rotation of said shaft, a pressure plate biased relative to said arms and including a forwardly arranged upper part adapted to be seated on said roller or tube and embodying a rearwardly disposed lower part having a depending lip tiltably resting on said shelf, a resilient pad mounted on said biased plate, threaded bolt means removably extending through said pad, pressure plate and shelf; adjustable means mounted on said bolt means for yieldingly clamping said pad against said pressure plate, an arcuate lip extending from and above said upper part and cooperating with said roller to flatten said tube on rotation of said shaft, and a manipulating wheel carried by said shaft.

3. In a machine for expelling the contents of a deformable and collapsible tube, a bracket comprising a horizontally disposed shelf including spaced arms having spaced bearing means, a shaft rotatably and removably sustained by said bearing means, a roller secured to said shaft and interposed between said arms and including means for retaining the sealed end of said tube for winding the latter about said roller on rotation of said shaft, a pressure plate biased relative to said arms and including a forwardly arranged upper part adapted to be seated on said roller or tube and embodying a rearwardly disposed lower part having a lip tiltably resting on said shelf, a rubber pad mounted on said biased pressure plate, a supplementary plate on said pad, bolt means extending through supplementary plate, pad, pressure plate and shelf and including a head seated on said supplementary plate, adjustable means mounted on said bolt means for yieldingly clamping said pad against said pressure plate, an arcuate lip extending from and above said upper part and cooperating with said roller to flatten said tube on rotation of said shaft, and manipulatable means carried by said shaft.

MAX BARNETT.

REFERENCES CITED

The following references are of record in the file of this patent:

UNITED STATES PATENTS

| Number | Name | Date |
|---|---|---|
| 764,103 | Baehr | July 5, 1904 |
| 1,208,620 | Moser | Dec. 12, 1916 |
| 1,320,275 | Roach | Oct. 28, 1919 |
| 1,543,518 | Ramsey | June 23, 1925 |
| 1,894,936 | Austin | Jan. 24, 1933 |
| 1,927,278 | Clark | Sept. 19, 1933 |
| 1,939,575 | Smith | Dec. 12, 1933 |
| 2,051,146 | Martin et al. | Aug. 18, 1936 |
| 2,073,473 | Gay | Mar. 9, 1937 |